United States Patent [19]

Burch

[11] Patent Number: 4,546,903
[45] Date of Patent: Oct. 15, 1985

[54] PORTABLE CAR WASH UNIT

[76] Inventor: David J. Burch, 107A Kenneth St., East Haven, Conn. 06512

[21] Appl. No.: 507,050

[22] Filed: Jun. 23, 1983

[51] Int. Cl.[4] .............................................. B65D 83/00
[52] U.S. Cl. .................................... 222/130; 222/401; 134/173
[58] Field of Search ............. 222/333, 160, 394, 401, 222/192, 205, 130; 15/264; 134/172, 173, 198, 200; 220/23.83, 85 R

[56] References Cited

U.S. PATENT DOCUMENTS

| | | | |
|---|---|---|---|
| 2,211,823 | 8/1940 | Jepson | 222/401 |
| 2,677,382 | 5/1954 | Cushing | 134/198 |
| 3,352,310 | 11/1967 | Doyscher | 134/198 |
| 4,154,367 | 5/1979 | Hanson et al. | 222/401 |

*Primary Examiner*—H. Grant Skaggs
*Assistant Examiner*—Kenneth Noland
*Attorney, Agent, or Firm*—Bachman & LaPointe

[57] ABSTRACT

A portable car wash unit comprises a first pressurized liquid reservoir and a second detergent reservoir removably secured to the pressurized liquid reservoir. The unit includes a motor compressor unit which communicates with the interior of the first liquid reservoir so as to pressurize the fluid content therein.

7 Claims, 4 Drawing Figures

4,546,903

PORTABLE CAR WASH UNIT

BACKGROUND OF THE INVENTION

The present invention relates to a portable wash unit and, more particularly, a portable car wash unit having a first pressurized liquid reservoir and a second detergent reservoir adapted to be removably secured to the pressurized liquid reservoir. The unit is readily transported for other uses and acts as a conservation item by limiting the available amount of water.

When washing an automobile, it is beneficial to have a source of water under pressure for rinsing the soap and detergent off the auto. For homeowners a source of pressurized water is generally no problem as most homes have readily accessible outside faucets to which a hose can be attached. However, for those people who live in high-rise apartments, townhouses or the like there are generally no sources or very limited sources of pressurized water. Failure to have a readily available source of pressurized water not only constitutes an inconvenience but also may result in damage to the body of the automobile due to the detergent which is not adequately rinsed from the auto. Naturally, it would be highly desirable to provide a portable car wash unit having a source of water under pressure for rinsing detergent from the body of an automobile. In addition, it would be highly desirable to provide a portable car wash unit which has a second detergent reservoir adapted to be removably secured to the pressurized liquid vessel.

Accordingly, it is a principal object of the present invention to provide a portable car wash unit having a self-contained source of pressurized water.

It is a particular object of the present invention to provide a portable car wash unit having a first pressurized liquid reservoir and a second detergent reservoir adapted to be removably secured to the pressurized liquid reservoir.

It is a further object of the present invention to provide a portable car wash unit having a self-contained compressor for pressurizing the liquid in the first pressurized liquid reservoir.

It is a still further object of the present invention to provide a portable car wash unit having a self-contained compressor which is capable of being operated off the battery of the vehicle being washed by using the cigarette lighter receptacle or attaching directly to the battery by clips.

It is another still further object of the present invention to provide a portable car wash unit which is relatively inexpensive to manufacture, is simple in construction and easy to use.

Further objects and advantages of the present invention will appear hereinbelow.

SUMMARY OF THE INVENTION

In accordance with the present invention the foregoing objects and advantages are readily obtained.

The present invention relates to a portable car wash unit and, more particularly, a portable car wash unit having a first pressurized liquid reservoir and a second detergent reservoir adapted to be secured to the pressurized liquid reservoir. In accordance with the present invention, the first pressurized liquid reservoir in the form of a tank made of plastic, metal or other suitable material is provided with a cap member onto which a portable air compressor is mounted. The air compressor communicates with the interior of the first liquid reservoir so as to pressurize same. The exterior of the tank is provided with a plurality of latch members which are adapted to securely receive the second detergent reservoir which is provided with a hollow cylindrical portion into which the cap member is telescopically received. The cap member is provided with a handle which projects out of the hollow cylindrical portion to allow for easy carrying of the unit. By way of the present invention, a readily available source of pressurized water is provided in a quantity sufficient to wash an automobile.

DETAILED DESCRIPTION

Figure 4:
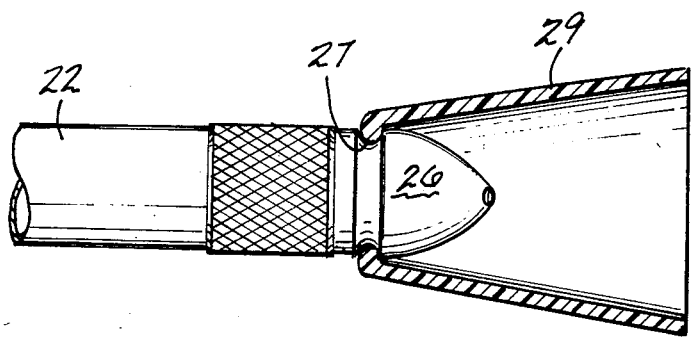
FIG. 4 is a view of a nozzle design for the portable car wash unit of FIG. 1.

Referring to the drawings, a portable car wash unit 10 comprises a pressure vessel 12 having an inlet opening 14 in the top thereof defined by neck 16. The neck 16 is provided with threads 18 onto which cap assembly 20 may be removably secured. The portable car wash unit 10 further includes flexible hose 22 having one end connected to the pressure vessel 12 by means of a fitting 24. Fitting 24 is in communication with vertical outlet tube 25 having a lower end 27 which opens into the lower portion of vessel 12. The other end of the flexible hose is provided with a spray head 26. In order to get a sufficient amount of water through the spray head while at the same time insuring economical use of the water supply, it is preferred that the opening in the nozzle have a diameter of between 0.040" and 0.070". The outer periphery of the pressure vessel 12 is provided with a plurality of brackets 28 for receiving the hose 22 when the hose is not in use. In addition the outer periphery of the pressure vessel 12 may be provided with a holster 30 for receiving the spray head 26. As shown in FIG. 4, the spray head 26 may be provided with a recess 27 adapted to receive a cone-shaped guard 29 which is made of plastic. The guard 29 protects the vehicle from the metal head 26 while at the same time funneling the spray flow. In addition to the foregoing, the pressure vessel is provided with a plurality of latches 32 for receiving and securing a bucket 33 to the pressure vessel 12 in a manner to be described in detail hereinbelow.

The cap assembly 20 comprises a threaded cap portion 34 and gasket 35 adapted to be secured to the threaded neck 16 of pressure vessel 12. The cap 34 has secured thereto by means of brackets 36 a motor-compressor unit 38. A suitable motor-compressor unit for use on the instant invention is a unit sold by the Coleman Company under the trademark INFLATE-ALL®. In particular, INFLATE-ALL® Models 2239D641 and 2239D661 are particularly suitable. The units comprise a motor portion 40 and a compressor portion 42. Motor 40 is provided with a plug-cord assembly 44 having a plug 46 adapted to plug into the cigarette lighter receptacle of an automobile. It should be appreciated that the plug-cord assembly 44 may be connected directly to the battery on an automobile by means of clips. In accordance with the present invention, the outlet 48 of the compressor assembly 42 is provided with a hose 50 which communicates with the interior of pressure vessel 12 by means of a hole provided in the cap 34. The hose may be sealed within the hole by any suitable known manner such as epoxy resin or the like. In addition, the hose may be secured to a spout provided on the cap by means of hose clamps or the like. A pressure switch may be provided in line 50 for sensing the pressure developed in pressure vessel 12 and for shutting off the on-off switch of the motor 40 of the compressor assembly 38 in response to a predetermined pressure level developed within the pressure vessel 12. Suitable pressure sensors for non-caustic fluids are the Series IV Sensors sold by the Hobbs Division of Stewart-Warner Corporation. The cap 34 has a handle portion 52 which may be made integral with the cap 34 by molding or secured thereto by any suitable means such as gluing or the like. The handle is provided with cut-outs 54 on the sides thereof for receiving the cord 56 of the plug-in cord assembly 44 when the compressor assembly unit is not in use. Handle 52 allows one to readily carry the portable car wash unit.

A bucket portion 33 is adapted to be fitted over the cap assembly 20 and secured to the pressure vessel 12. The bucket 33 comprises a flanged portion 58 provided with a plurality of clips 60 which are adapted to be clamped by latches 32. The bucket comprises a base portion 64 and a conical side wall portion 66 which define with a hollow tubular portion 68 a reservoir 70. The hollow tubular portion 68 is adapted to fit over cap assembly 20 when the bucket 33 is secured to the pressure vessel 12 in the manner described above. The flange 58 and conical side walls 66 are provided with a cut-out portion which fits over the fitting 24 provided on pressure vessel 12. The hollow portion 68 is provided with a handle 74 to allow for carrying of the bucket 33 when the bucket is not attached to the pressure vessel 12.

Figure 1:
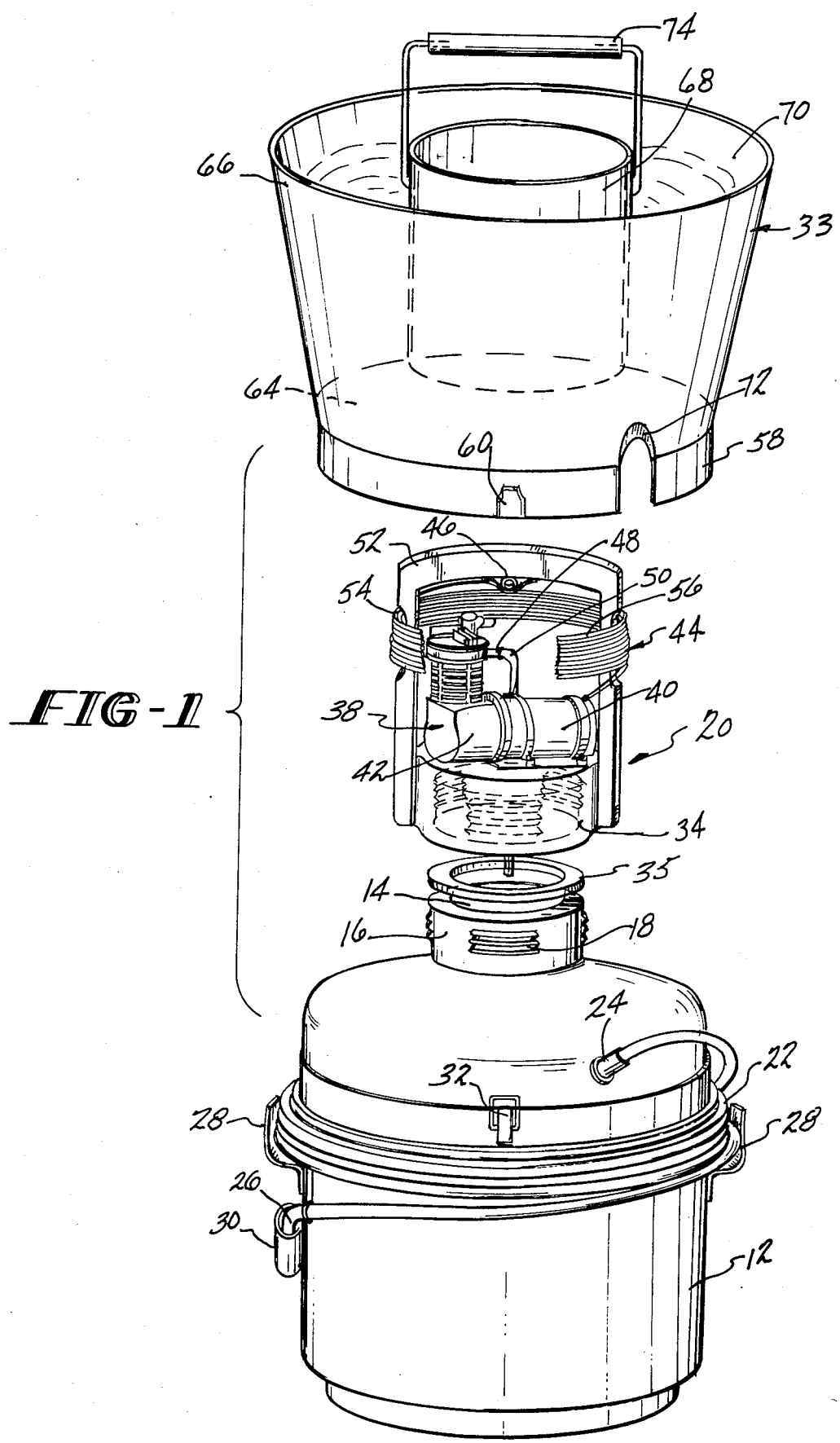
FIG. 1 is an exploded view of the portable car wash unit in accordance with the present invention.
Figure 2:
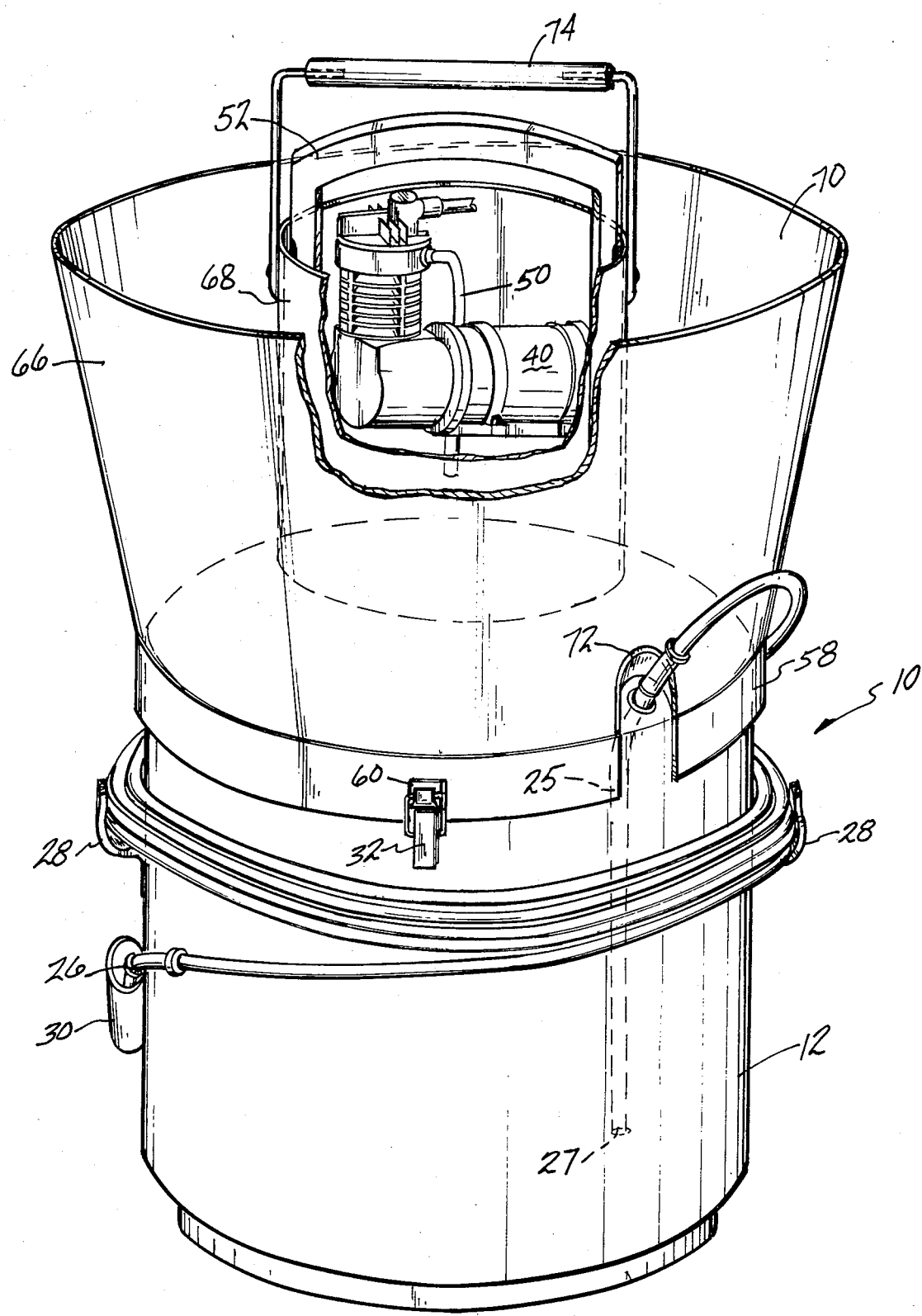
FIG. 2 is a view of the portable car wash unit of FIG. 1 completely assembled.
Figure 3:
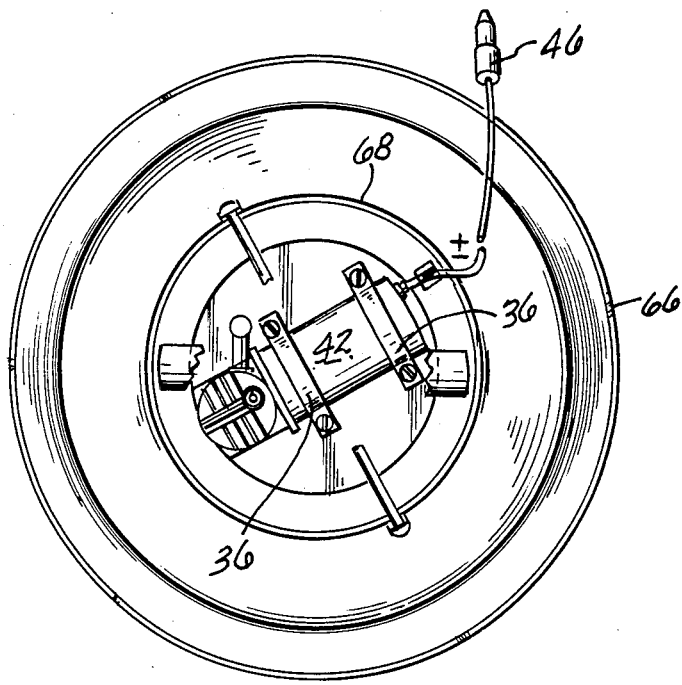
FIG. 3 is a top view of the portable car wash unit illustrated in FIG. 2.

When the portable car wash unit 10 is assembled as illustrated in FIG. 2, it is readily carried by means of handle 52 on the cap assembly 20. In accordance with the present invention, in order to have a sufficient amount of water to wash and rinse the automobile, it is useful to have a pressure vessel which would contain at least five (5) gallons usable of water. It should be appreciated that a bigger pressure vessel could be used and, likewise, the pressure vessel could be mounted on wheels so as to allow the unit to be rolled from place to place. In such a manner the device of the present invention may be used as a shower unit at a campsite or any other suitable purpose. In accordance with the present invention, the bucket 33 is intended to carry the wash detergent solution while the pressurized reservoir contained in pressure vessel 12 is to be used to rinse the detergent from the car. In accordance with the present invention, when the plug 46 is plugged into the cigarette lighter receptacle of the vehicle and the motor 40 of the compressor unit 38 is turned on, compressed air is fed via line 50 to the pressure vessel 12 so as to produce a pressure head over the water contained within the pressure vessel. Once the pressure reaches a predetermined level the pressure sensor shuts off the on-off switch of the motor 40 of the compressor unit 38. The pressurized water in the pressure vessel 12 can then be delivered via flexible hose 22 and spray head 26. When the pressure drops below a predetermined level the pressure sensor again senses the pressure to start the motor 40 of the compressor unit 38 for charging the pressure vessel 12. In accordance with the present invention, the portable car wash unit provides a self-contained pressurized liquid reservoir and a separate detergent reservoir in a single unit.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A portable car wash unit assembly comprising a first hollow liquid reservoir, said first hollow liquid reservoir being provided with a neck portion defining an opening into the interior of said first hollow liquid reservoir, closure means removably secured to said neck portion for sealing said first hollow liquid reservoir, an air compressor mounted on said closure means and having a compressed air outlet in fluid communication with the interior of said first hollow liquid reservoir in sealing engagement therewith for providing a head of compressed air over liquid in said first hollow liquid reservoir, outlet hose assembly associated with the interior of said first hollow liquid reservoir for delivering liquid under pressure from said first hollow liquid reservoir and a second reservoir removably secured to the exterior surface of said first hollow liquid reservoir, said second reservoir being formed in part by a hollow tubular portion adapted to telescopically receive said closure means.

2. A car wash unit according to claim 1 wherein said closure means comprises a cap assembly having a threaded cap portion and a handle portion integral with said cap portion wherein said handle portion projects out of said hollow tubular portion of said second reservoir when said second reservoir is secured to said first hollow liquid reservoir.

3. A car wash unit according to claim 2 wherein said handle is provided with recesses for receiving a cord assembly for said compressor.

4. A car wash unit according to claim 3 wherein said cord assembly is provided with a plug adapted to be received in the lighter receptacle of a car.

5. A car wash unit according to claim 1 wherein a pressure sensor is provided for sensing the pressure in said first hollow liquid reservoir.

6. A car wash unit according to claim 1 wherein said first hollow liquid reservoir and said second reservoir are provided with securing means for removably securing said second reservoir to said first hollow liquid reservoir.

7. A car wash unit according to claim 6 wherein said securing means comprises a plurality of latches.

* * * * *